(12) United States Patent
Doi et al.

(10) Patent No.: US 9,359,016 B2
(45) Date of Patent: Jun. 7, 2016

(54) CABIN FOR WORK VEHICLES

(71) Applicant: Iseki & Co., Ltd., Ehime-ken (JP)

(72) Inventors: Itsuki Doi, Ehime-ken (JP); Takeshi Hagiyama, Ehime-ken (JP); Koji Ochi, Ehime-ken (JP); Takayuki Kajihara, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 2 days.

(21) Appl. No.: 14/191,055

(22) Filed: Feb. 26, 2014

(65) Prior Publication Data
US 2014/0292035 A1  Oct. 2, 2014

(30) Foreign Application Priority Data

Feb. 28, 2013  (JP) .................................. 2013-39477

(51) Int. Cl.
*B62D 33/06*  (2006.01)
(52) U.S. Cl.
CPC .................................. *B62D 33/0617* (2013.01)
(58) Field of Classification Search
CPC ................ B60H 2001/00235; B60H 1/00357; B60H 1/00378; B62D 25/06; B62D 27/02; B62D 33/0612; B62D 33/0617
See application file for complete search history.

(56) References Cited

U.S. PATENT DOCUMENTS

| | | | | |
|---|---|---|---|---|
| 3,397,008 | A | * | 8/1968 | Timmerman ............. 296/190.11 |
| 4,049,294 | A | * | 9/1977 | Atherton ....................... 280/756 |
| 4,135,756 | A | * | 1/1979 | Hausmann ............... 296/190.03 |
| 4,650,242 | A | * | 3/1987 | Obe et al. .................. 296/190.08 |
| 4,721,031 | A | * | 1/1988 | Nakata et al. ................. 454/121 |
| 4,772,065 | A | * | 9/1988 | Nakata et al. .................. 264/279 |
| 5,695,238 | A | * | 12/1997 | Calamari et al. .............. 296/210 |
| 6,189,955 | B1 | * | 2/2001 | Fryk et al. ................ 296/190.08 |
| 8,944,199 | B2 | * | 2/2015 | Fukunaga .............. B60K 11/06 180/68.5 |

(Continued)

FOREIGN PATENT DOCUMENTS

| | | | | |
|---|---|---|---|---|
| DE | 1780080 | A1 * | 8/1972 | ............. B26D 33/06 |
| DE | 2223899 | A1 * | 12/1973 | ............. B62D 33/06 |

(Continued)

*Primary Examiner* — Glenn Dayoan
*Assistant Examiner* — Paul Chenevert
(74) *Attorney, Agent, or Firm* — Finnegan, Henderson, Farabow, Garrett & Dunner LLP

(57) ABSTRACT

A cabin frame structure that allows a roof to be tightly attached is provided. A work vehicle cabin includes lateral frame members extending laterally, each of the lateral frame members having an upper surface and an end; longitudinal frame members extending longitudinally, each of the longitudinal frame members having an upper surface and an end; connecting plates each having an upper surface, the connecting plates connecting the lateral frame members and the longitudinal frame members, the connecting plates straddling across the lateral frame members and the longitudinal frame members; pillars attached to the ends of the lateral frame members, the ends of the longitudinal frame members, and the connecting plates; a roof disposed over the lateral frame members, the longitudinal frame members, and the connecting plates; and a seal provided between the roof and the lateral frame members, the longitudinal frame members, and the connecting plates.

1 Claim, 18 Drawing Sheets

(56) References Cited

U.S. PATENT DOCUMENTS

| | | | |
|---|---|---|---|
| 2001/0050495 A1* | 12/2001 | Sorensen et al. | 296/102 |
| 2002/0011743 A1* | 1/2002 | Tiziano | 296/190.08 |
| 2002/0079721 A1* | 6/2002 | Colliar et al. | 296/190.08 |
| 2006/0246834 A1* | 11/2006 | Masumoto et al. | 454/109 |
| 2007/0044492 A1* | 3/2007 | Ichikawa et al. | 62/239 |
| 2007/0205633 A1* | 9/2007 | Waco et al. | 296/190.09 |
| 2008/0079281 A1* | 4/2008 | Aoyama et al. | 296/39.3 |
| 2008/0238144 A1* | 10/2008 | Kamimae | 296/190.08 |
| 2010/0314908 A1* | 12/2010 | Wood et al. | 296/190.03 |
| 2010/0320804 A1* | 12/2010 | Kamimae et al. | 296/190.08 |
| 2011/0241379 A1* | 10/2011 | Obe et al. | 296/190.09 |
| 2011/0316309 A1* | 12/2011 | Kawashiri | 296/210 |
| 2013/0139921 A1* | 6/2013 | Doi | F16L 55/09 137/899 |
| 2013/0154309 A1* | 6/2013 | Kamimae | 296/190.08 |
| 2014/0319875 A1* | 10/2014 | Scott | 296/190.03 |

FOREIGN PATENT DOCUMENTS

| | | | | |
|---|---|---|---|---|
| EP | 0241653 A2 | * | 10/1987 | B60H 1/00 |
| EP | 1288035 A1 | * | 3/2003 | B60H 1/00378 |
| FR | 2333691 A1 | * | 7/1977 | B62D 33/06 |
| JP | 4246219 | | 4/2009 | |
| JP | 2010-215024 | | 9/2010 | |
| JP | 4891889 | | 3/2012 | |
| JP | 2012-176683 | | 9/2012 | |
| SU | 1495146 A1 | * | 7/1989 | B60H 1/24 |

\* cited by examiner

CABIN FOR WORK VEHICLES

CROSS-REFERENCE TO RELATED APPLICATION

This application is based upon and claims the benefit of priority from Japanese Patent Application No. 2013-39477, filed on Feb. 28, 2013, the entire content of which is incorporated herein by reference.

FIELD OF THE INVENTION

The present invention relates to a cabin for work vehicles, such as tractors.

BACKGROUND OF THE INVENTION

Japanese Laid-open Patent Publication Number 2012-176683 and Japanese Patent Number 4246219 disclose framework of tractor cabins. In addition, Japanese Laid-open Patent Publication Number 2010-215024 and Japanese Patent Number 4891889 disclose sealing structures for roofs.

SUMMARY OF THE INVENTION

An object of the invention is to provide a structure that allows an entire roof to be tightly attached.

In one aspect, a work vehicle cabin is equipped with lateral frame members extending laterally, each of the lateral frame members having an upper surface and an end; longitudinal frame members extending longitudinally, each of the longitudinal frame members having an upper surface and an end; connecting plates each having an upper surface, the connecting plates connecting the lateral frame members and the longitudinal frame members, the connecting plates straddling across the upper surfaces of the lateral frame members and the upper surfaces of the longitudinal frame members, the end of lateral frame members and the end of the longitudinal frame members forming spaces therebetween; pillars provided in the spaces and attached to the ends of the lateral frame members, the ends of the longitudinal frame members, and the connecting plates; a roof disposed over the lateral frame members, the longitudinal frame members, and the connecting plates; and a seal provided between the roof and the upper surfaces of the lateral frame members, the upper surfaces of the longitudinal frame members, and the connecting plates.

In another aspect, a work vehicle cabin, includes front and rear frame members extending laterally, each of the front and rear frame members having an upper surface and ends; a pair of side frame members extending longitudinally, each of the side frame members having an upper surface, a front end, and a rear end; front connecting plates having upper surfaces and connecting the side frame members and the front frame member, the front connecting plates straddling across the upper surfaces of the side frames and the upper surface of the front frame member, the front ends of the side frame members and the ends of the front frame member forming front spaces therebetween; rear connecting plates having upper surfaces and connecting the side frame members and the rear frame member, the rear connecting plates straddling across the upper surfaces of the side frame members and the upper surface of the rear frame member, the rear ends of the side frame members and the ends of the rear frame member forming rear spaces therebetween; front pillars provided in the front spaces and attached to the front ends of the side frame members, the ends of the front frame members, and the front connecting plates; rear pillars provided in the rear spaces and attached to the rear ends of the side frame members, the ends of the rear frame members, and the rear connecting plates; an air conditioner unit; a roof extending over the air conditioner unit; and a seal provided between the roof and the upper surfaces of the side frame members, the upper surface of the front frame member, the upper surface of the rear frame member, the upper surfaces of the front connecting plates, and the upper surfaces of the rear connecting plates.

In yet another aspect, the work vehicle cabin has the air conditioner unit provided behind the rear frame member and is covered with a cover, the cover having an upright wall formed along sides and rear thereof defining a tray shape, a flange formed along an upper end of the upright wall for attachment with the roof, the upright wall having a front end attached to the rear connecting plates, and wherein the seal is provided between the upper surfaces of the rear connecting plates and the flange.

In this structure, it is possible to provide a strong connection structure between the pillars, the lateral frame members, the longitudinal frame members, and the connecting plates. It is also possible to attach the seal along a flat upper surface that extends across the lateral frame members, the longitudinal frame members, and the connecting plates. As a result, the roof can be attached tightly. Moreover, the front pillars can be aligned easily during cabin assembly since the front frame member and the side frame members are connected using the front connecting plates prior to attaching the front pillars. A strong connection structure can be provided between the front pillars, the front frame member, the side frame members, and the front connecting plates.

Furthermore, the rear pillars can be aligned easily since the rear frame member and the side frame members are connected using the rear connecting plates prior to attaching the rear pillars. A strong connection structure can be provided between the rear pillars, the rear frame member, the side frame members, and the connecting plates. Also, it is possible to attach the seal along a flat upper surface that extends across the front frame member, the side frame members, the front connecting plates, and the rear connecting plates. As a result, the roof can be attached tightly.

Additionally, the cover can be attached using the rear frame member and the rear connecting plates. The seal can be easily attached since the seal is diverted around the front pillars and the rear pillars. The seal that joins with the roof extends across the upper surfaces of the rear connecting plates and over the flange. This allows the roof to be attached tightly.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate embodiments of the invention and together with the description, serve to explain the principles of the invention.

DESCRIPTION OF THE EXEMPLARY EMBODIMENTS

Reference will now be made in detail to the exemplary embodiments of the invention. Wherever possible, the same reference numbers will be used throughout the drawings to refer to the same or like parts.

An embodiment in the form of a cabin K of a tractor is described.

In this embodiment, "front" refers to the direction in which the tractor moves forward, and "left" and "right" refers to directions along the axis perpendicular to the direction in which the tractor moves forward.

Figure 1:
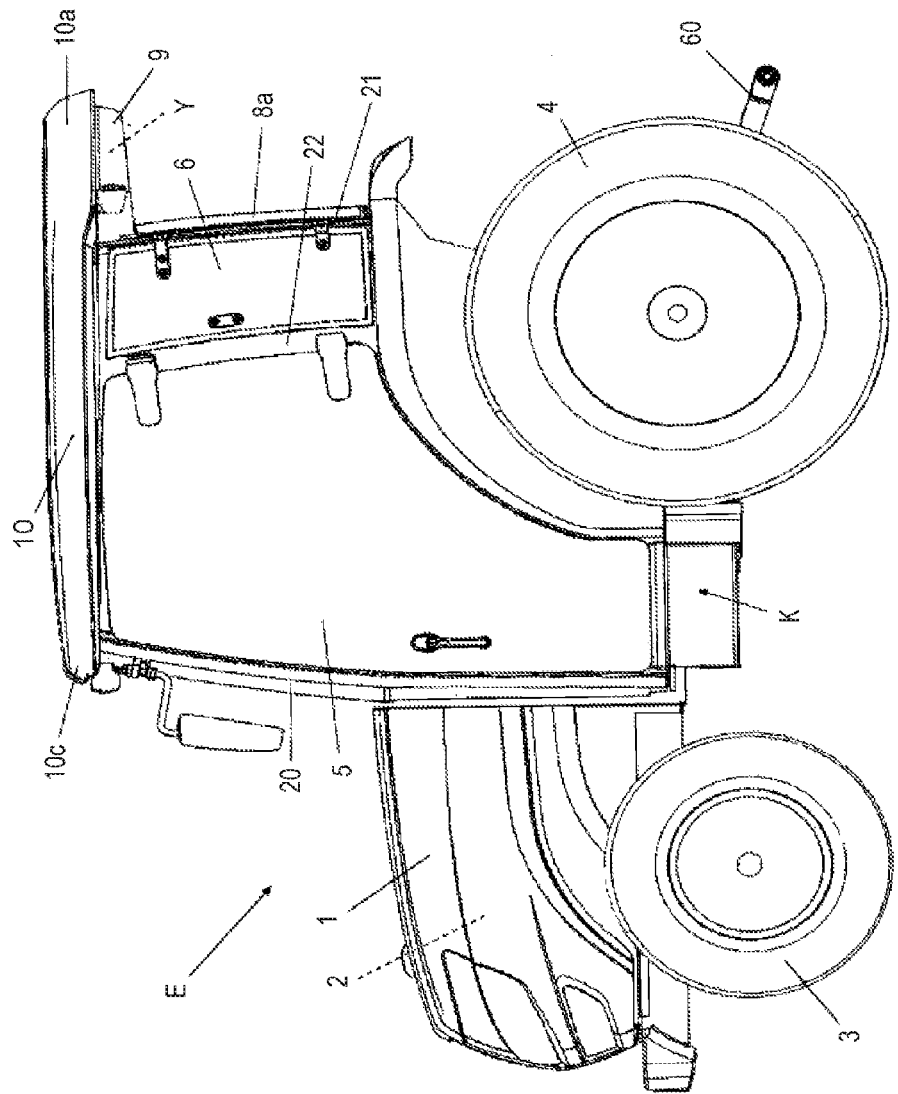
FIG. 1 is an exterior side view of a tractor according to one embodiment of the invention.
Figure 2:
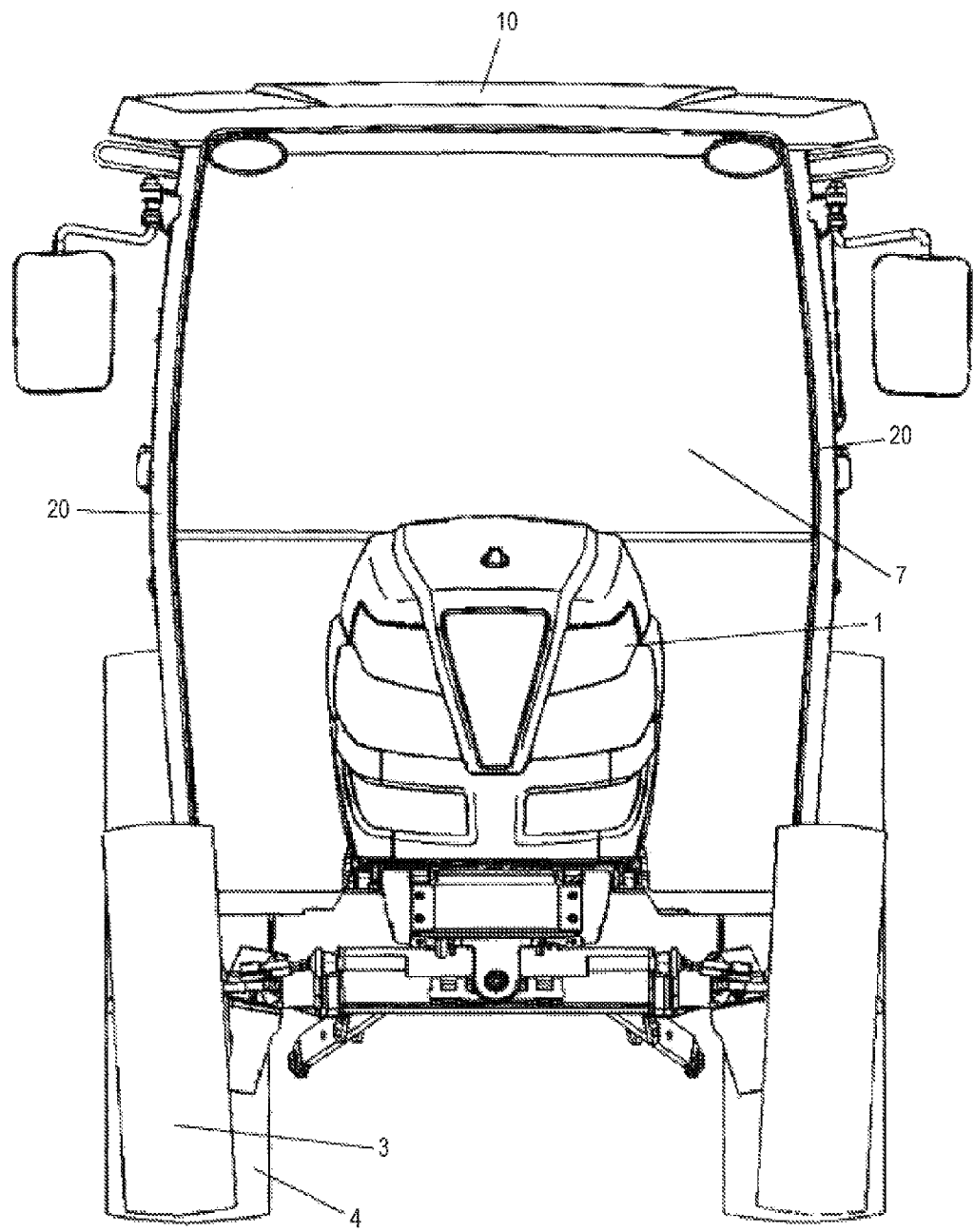
FIG. 2 is an exterior front view of the tractor.
Figure 3:
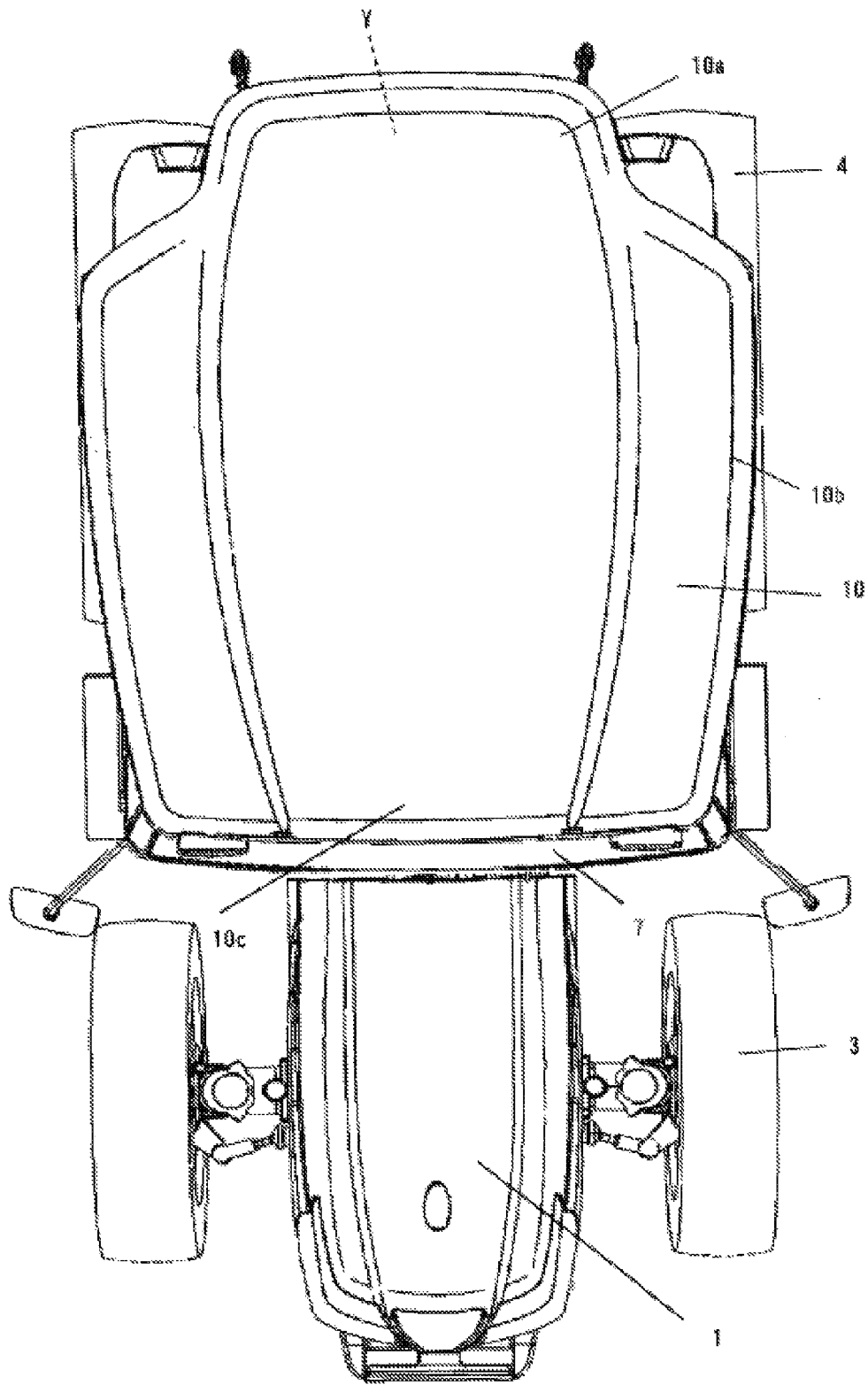
FIG. 3 is an exterior plan view of the tractor.
Figure 4:
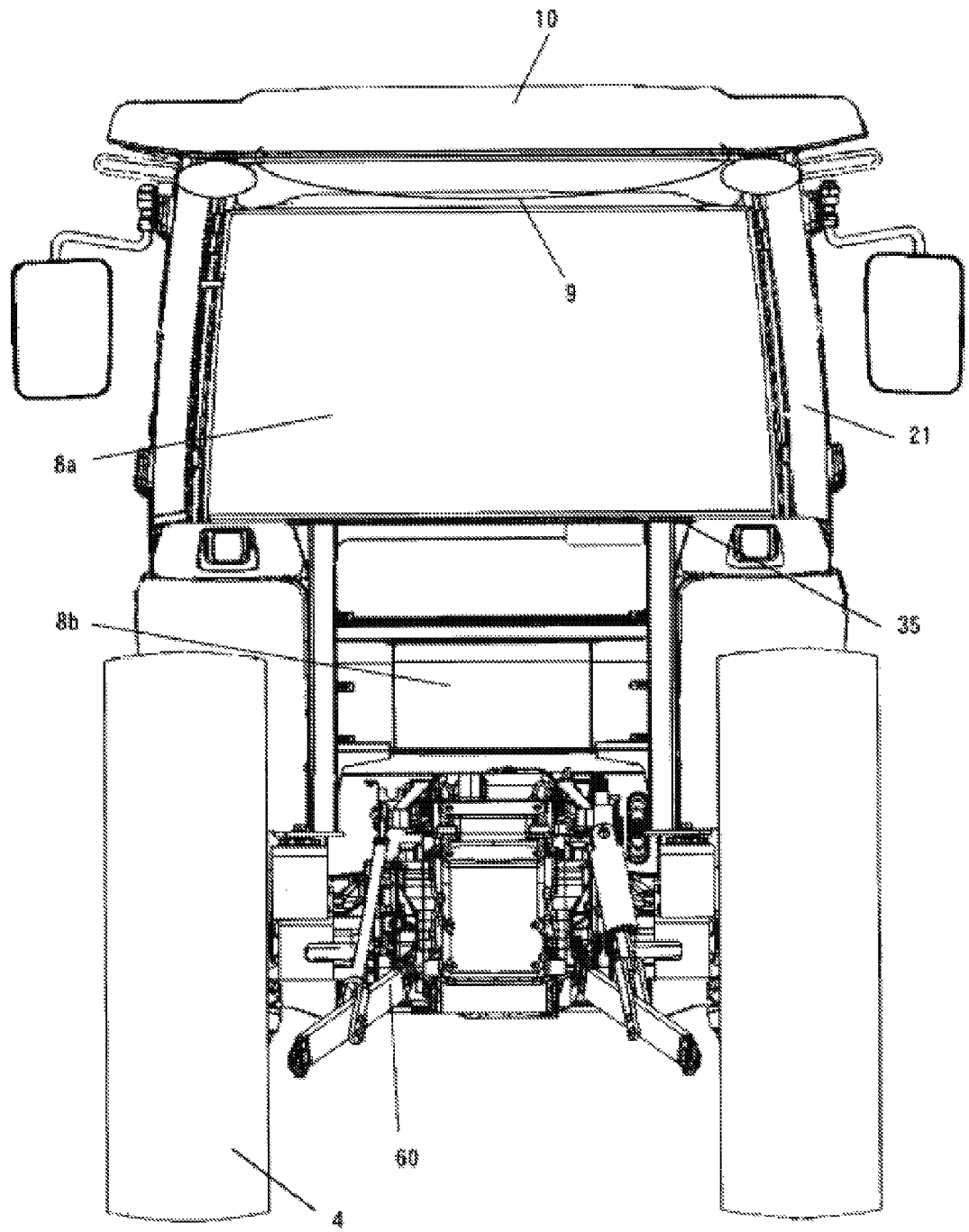
FIG. 4 is an exterior rear view of the tractor.
Figure 5:
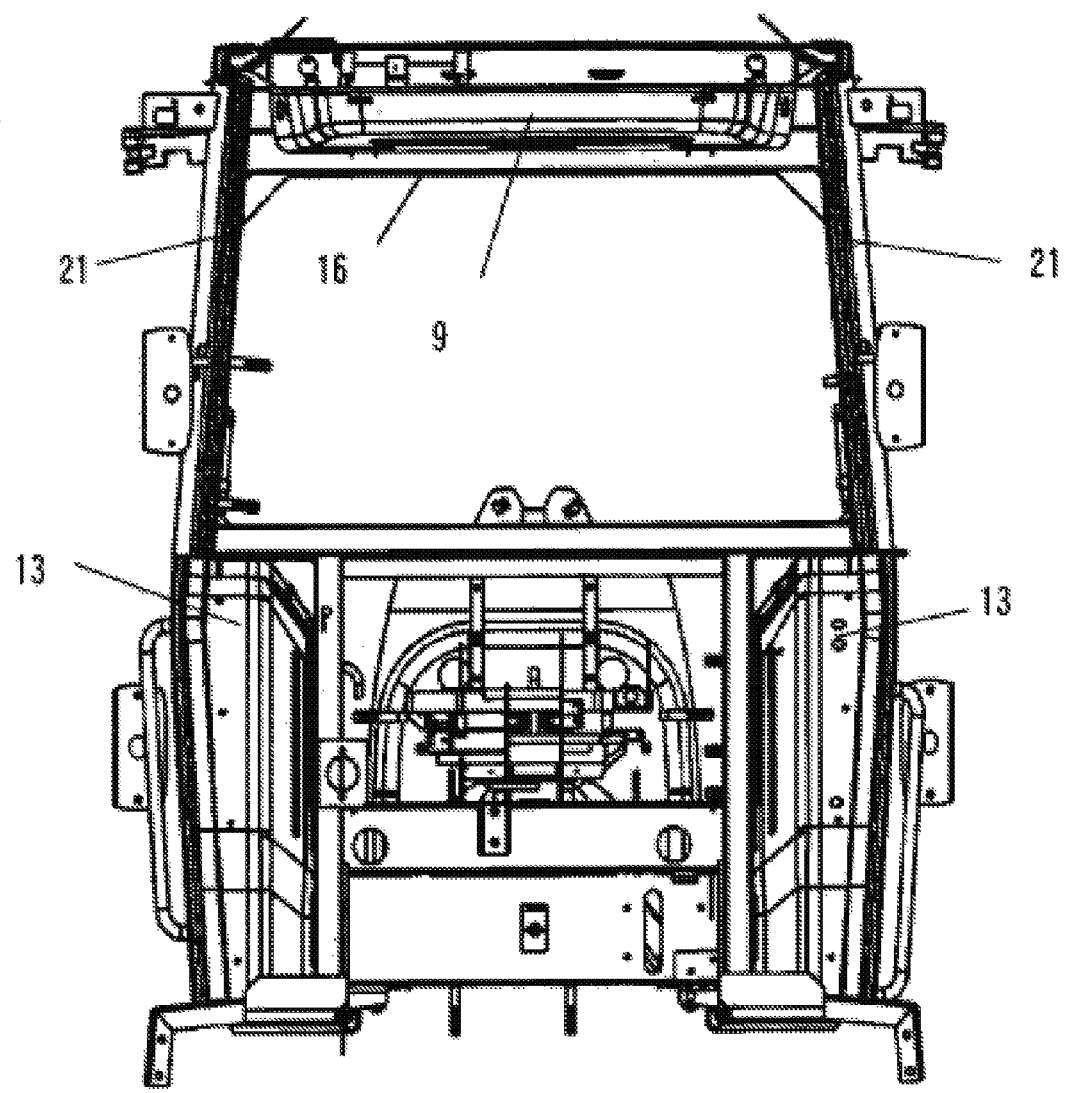
FIG. 5 is a rear view illustrating a frame structure of a cabin.
Figure 6:
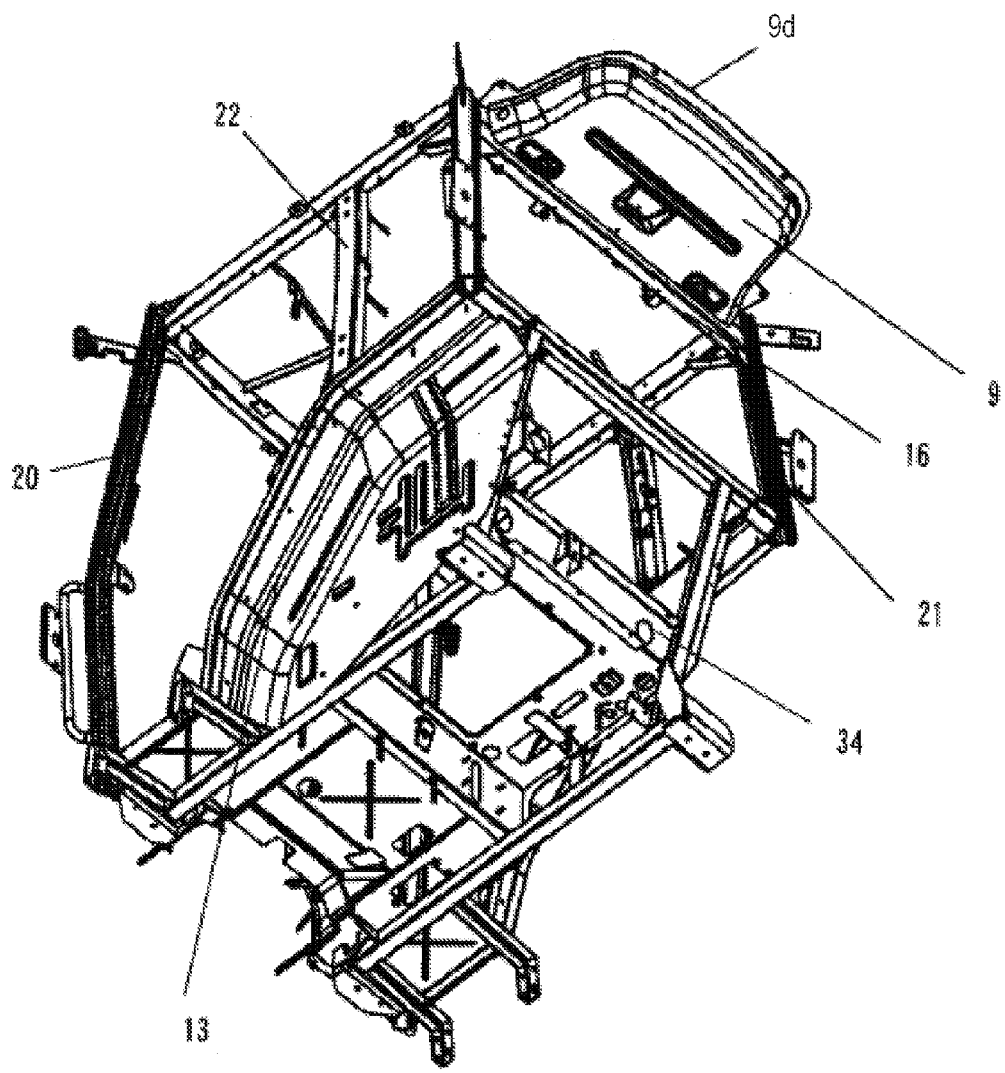
FIG. 6 is a perspective view illustrating the cabin frame structure as from the bottom.
Figure 7:
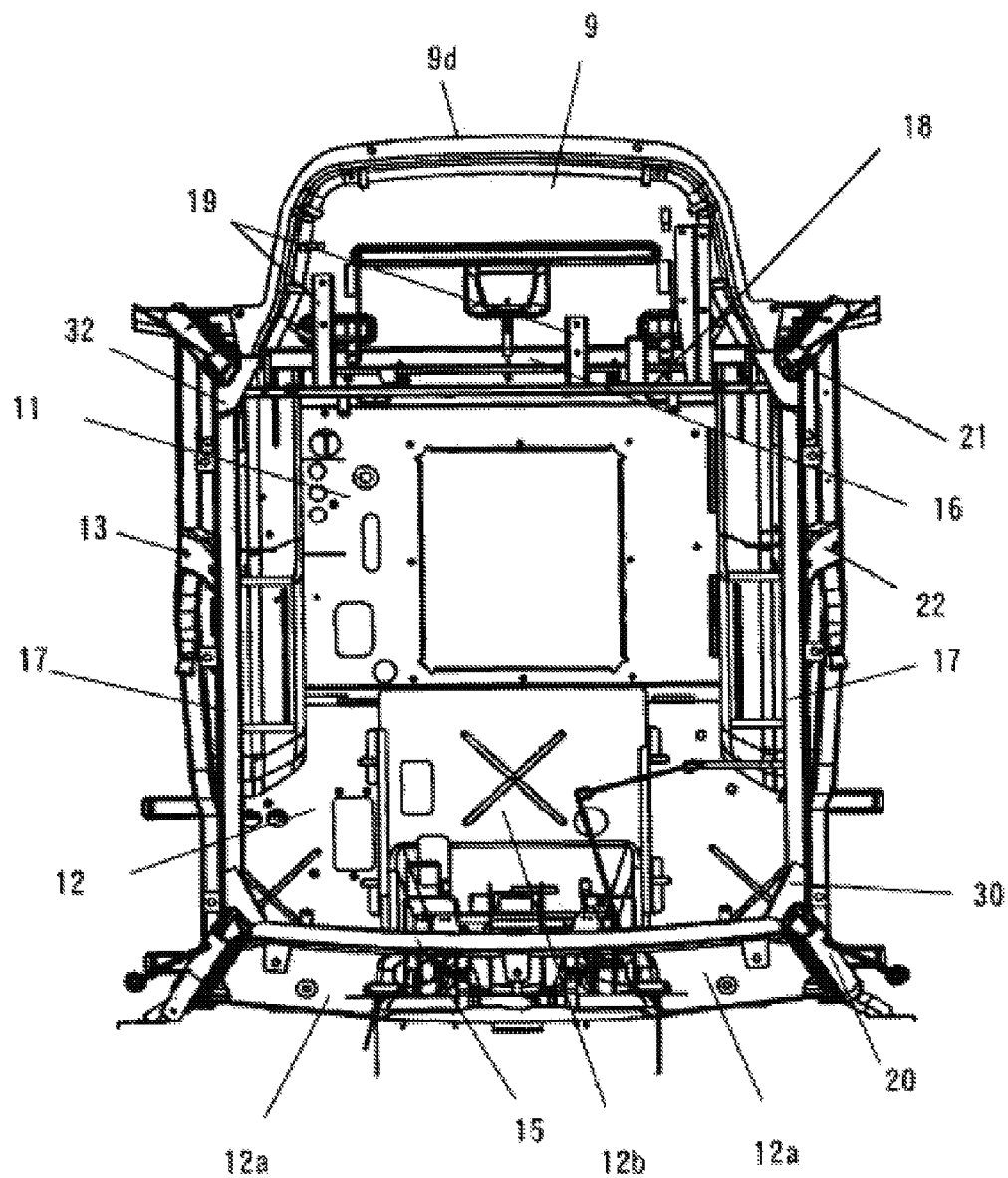
FIG. 7 is a plan view of the cabin frame structure.
Figure 8:
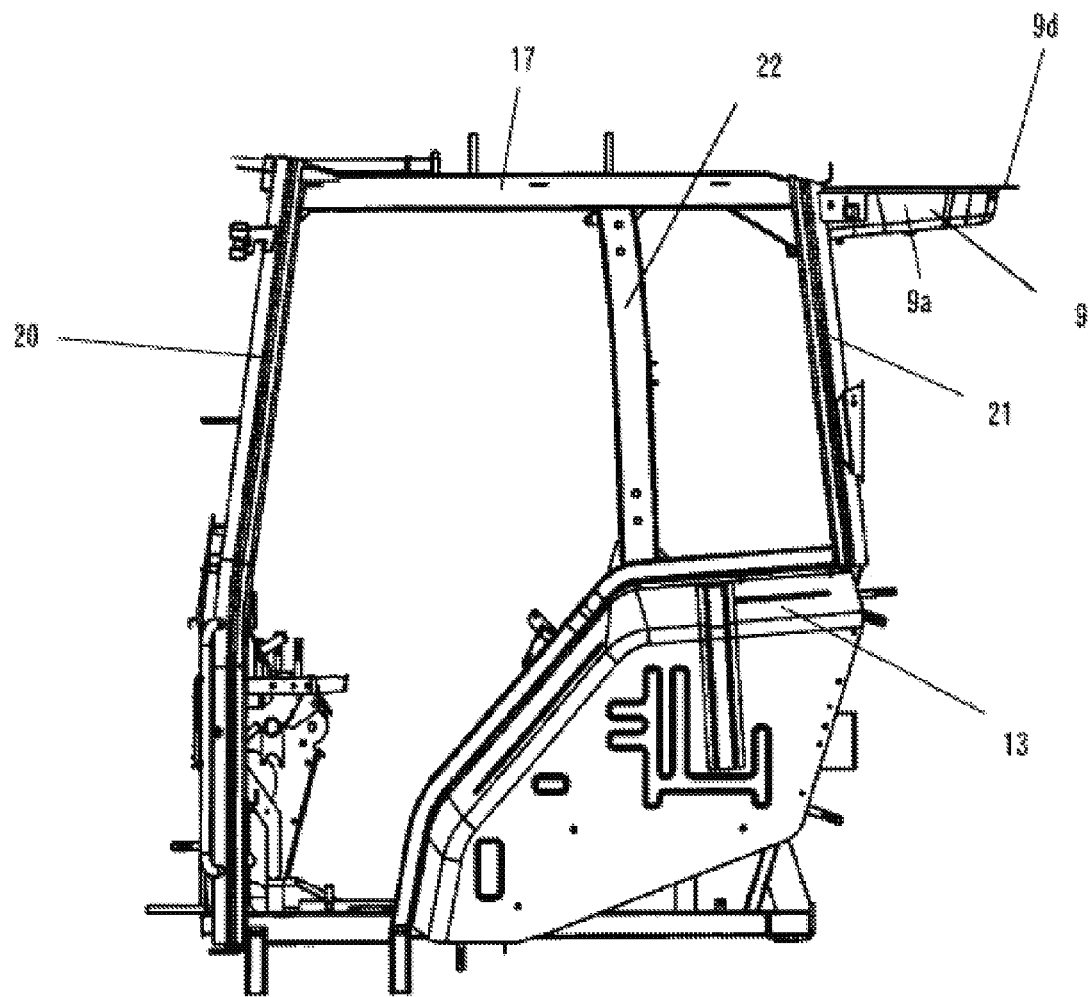
FIG. 8 is a side view of the cabin frame structure.
Figure 9:
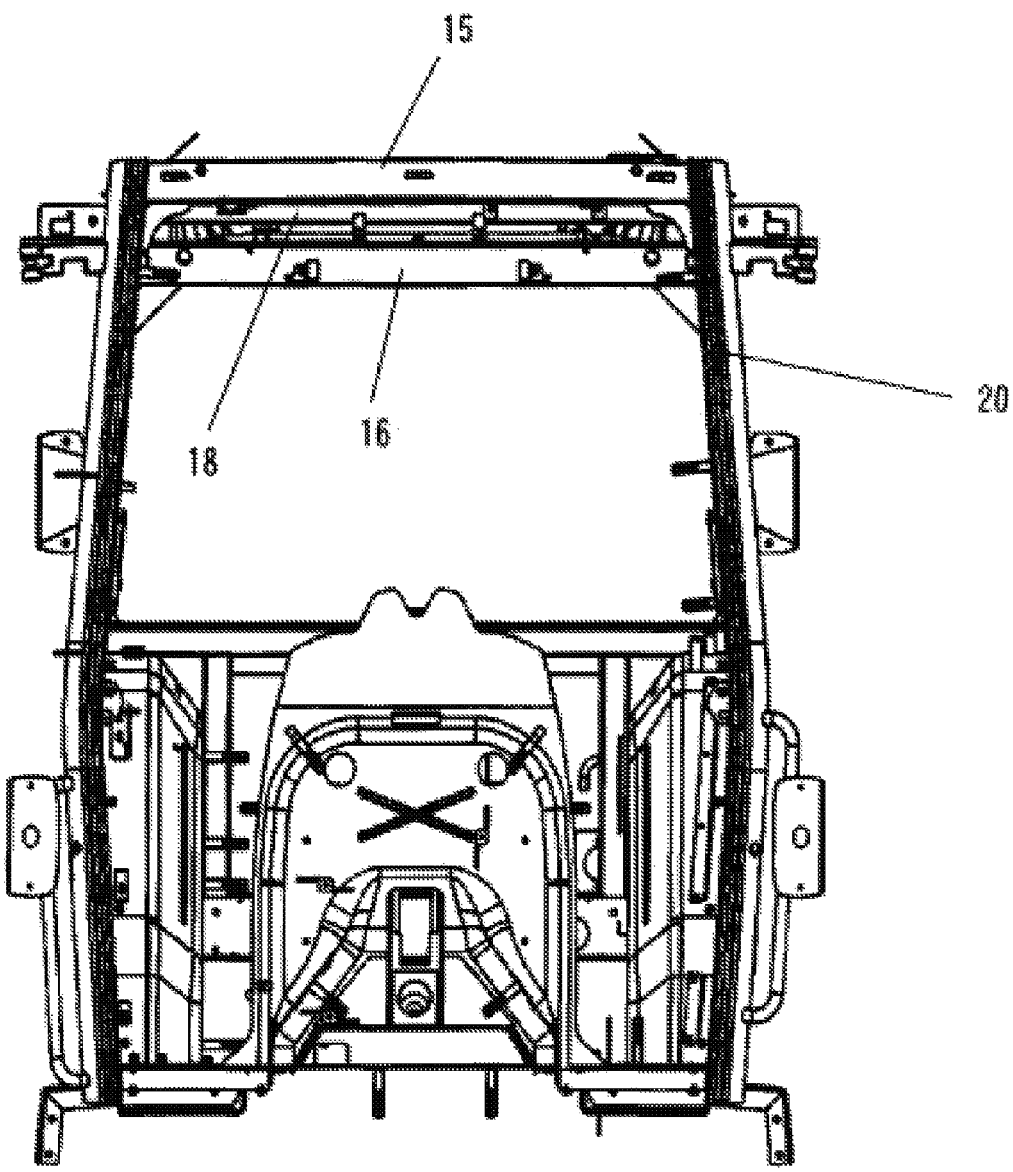
FIG. 9 is a front view of the cabin frame structure.
Figure 10:
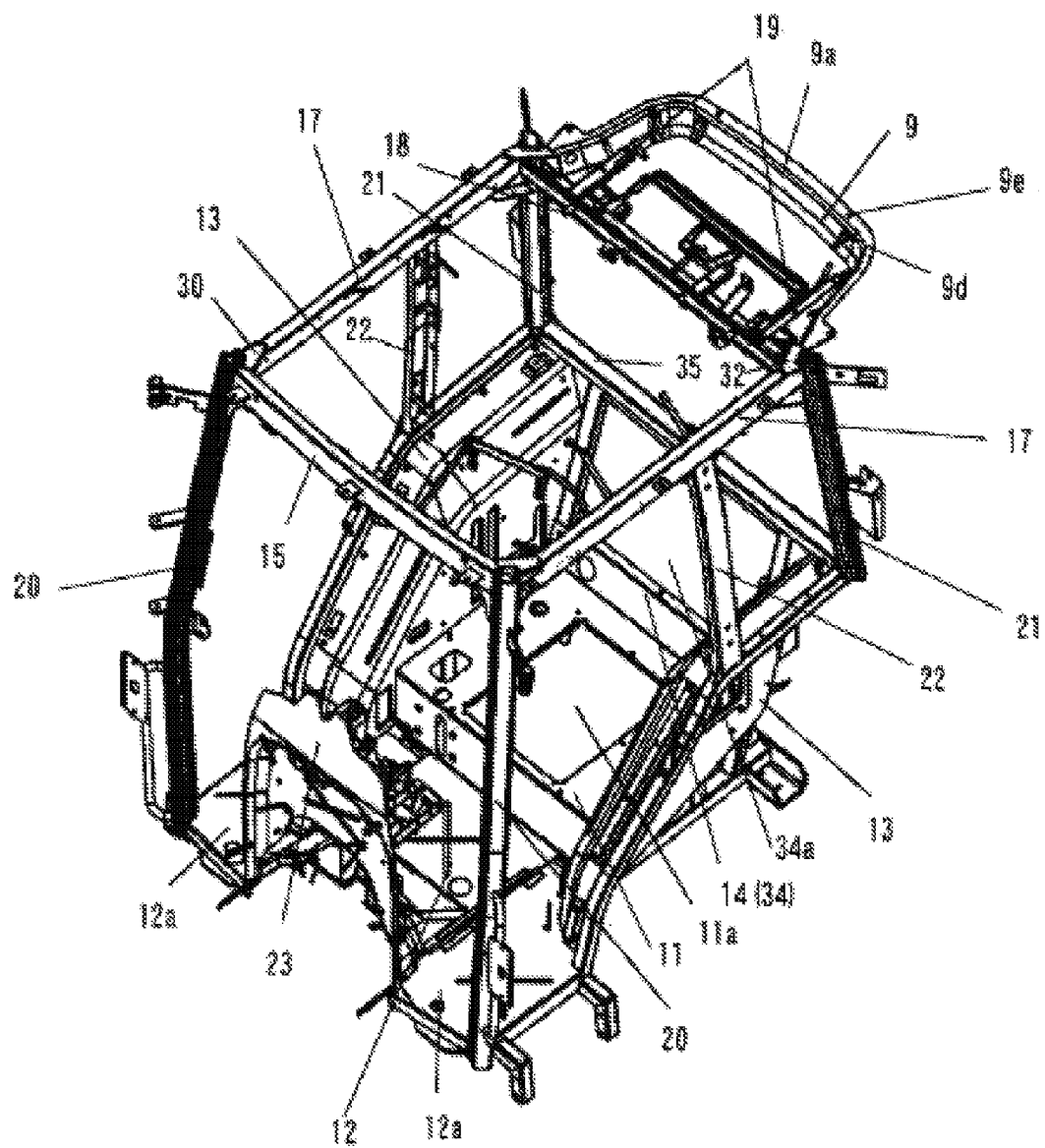
FIG. 10 is a perspective view of the cabin frame structure as seen from the top.
Figure 11:
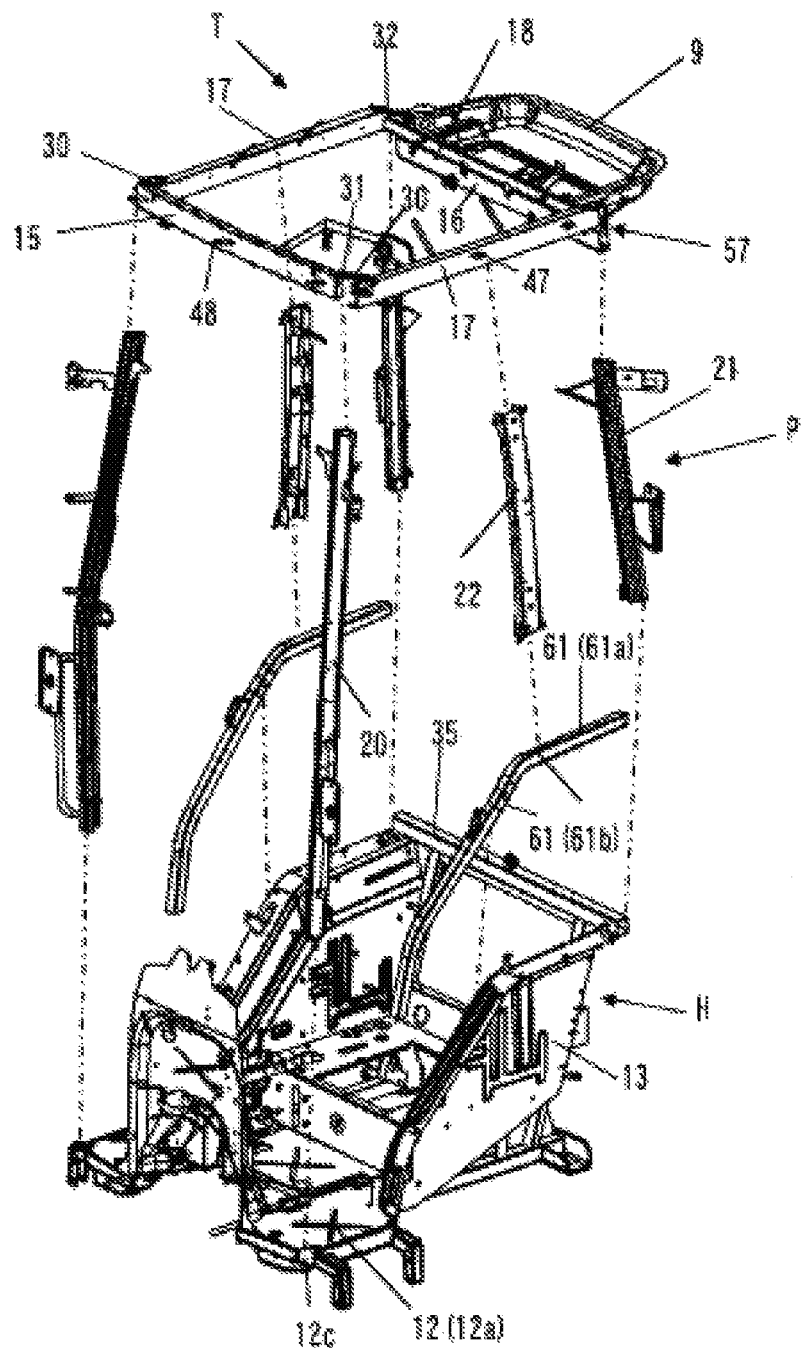
FIG. 11 is a perspective view illustrating a cabin assembly.
Figure 12:
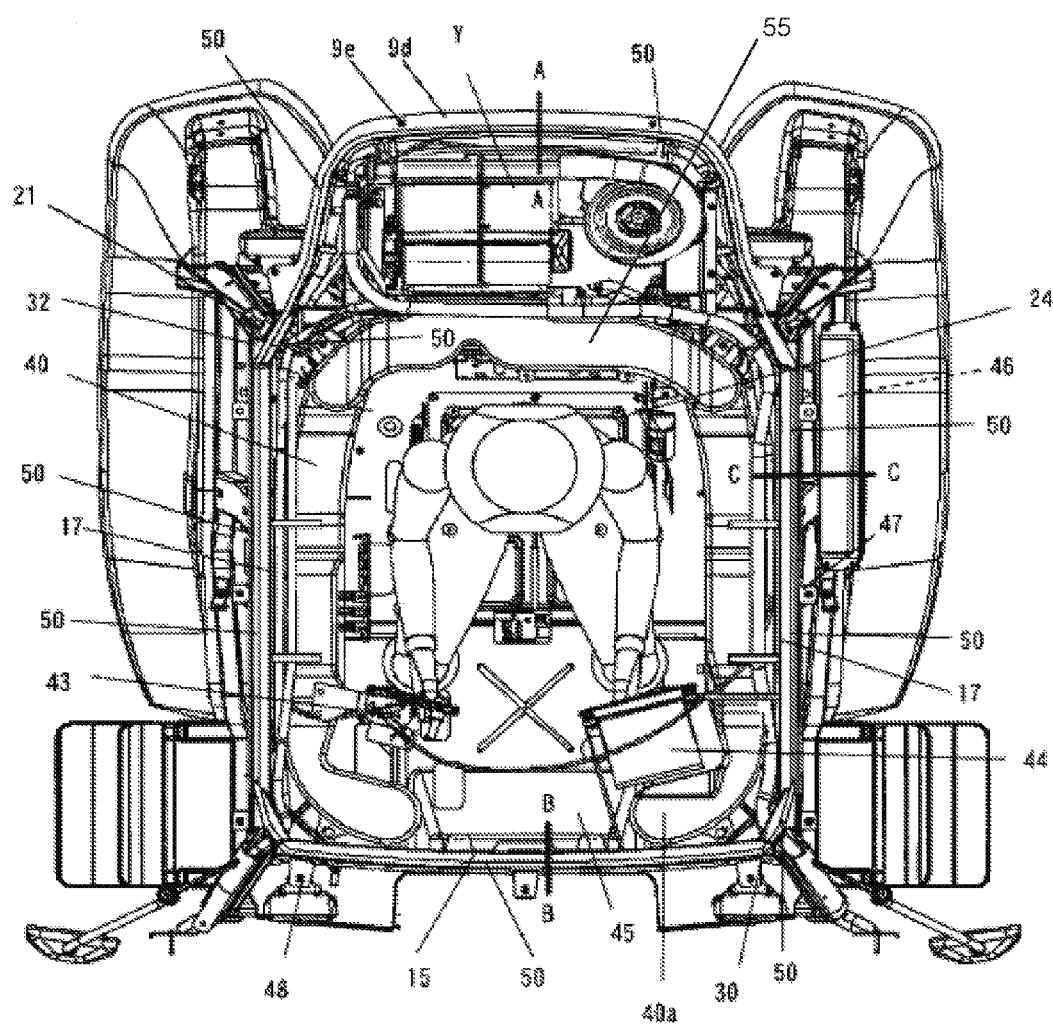
FIG. 12 is a plan view of an internal structure of the cabin.
Figure 13:
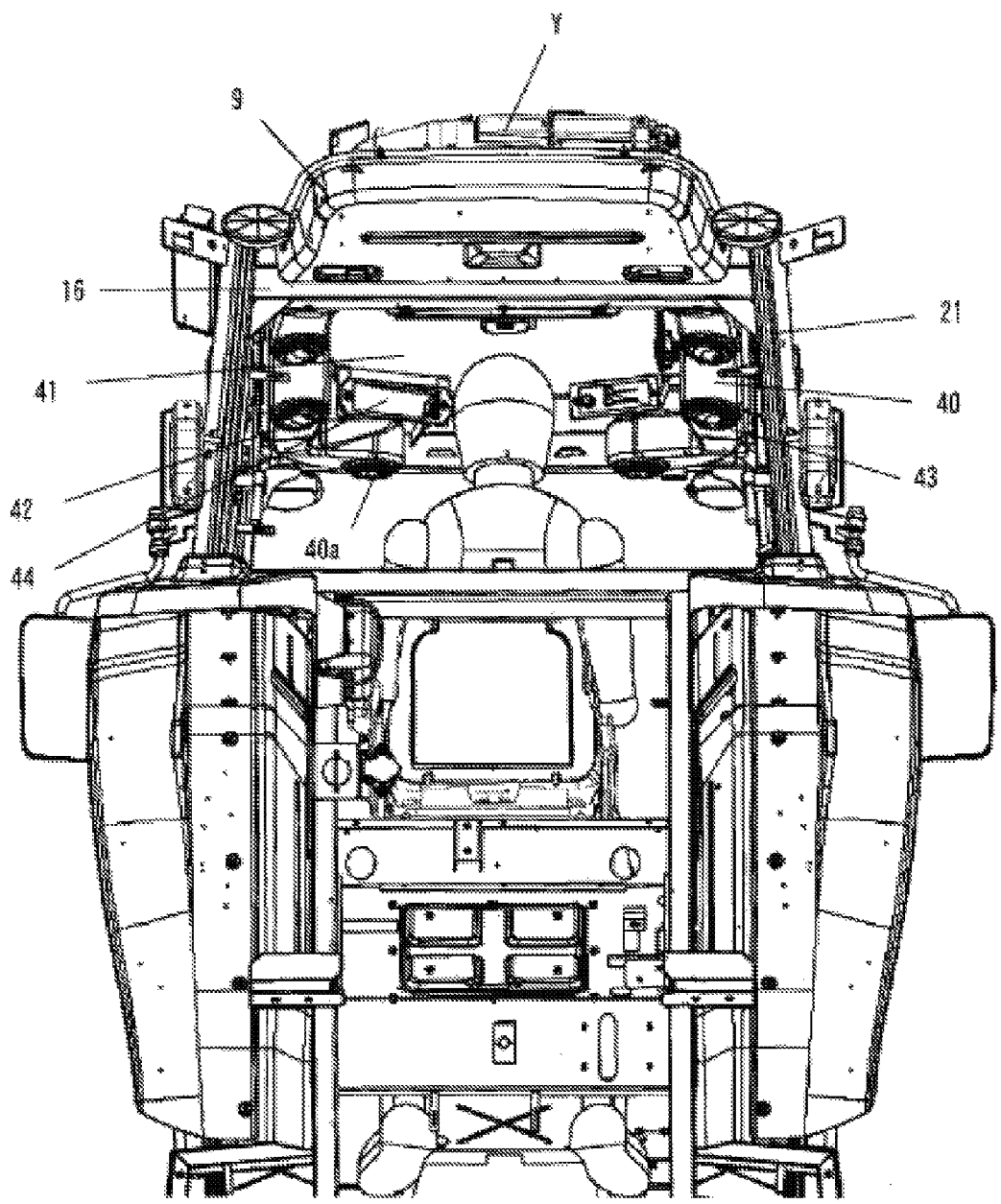
FIG. 13 is an inside view of the cabin as seen from the rear.
Figure 14:
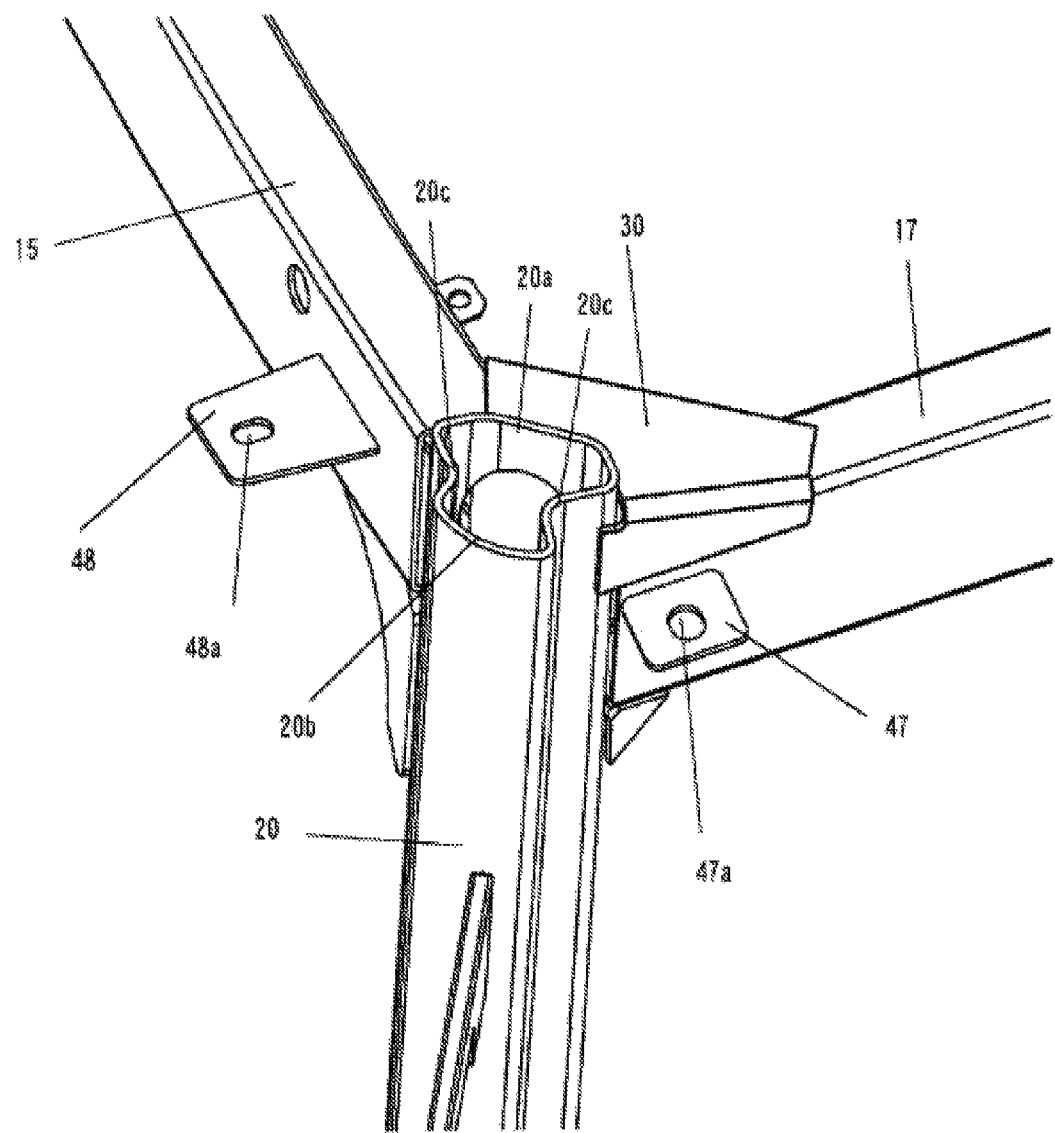
FIG. 14 is an expanded view of a part of the cabin frame structure.
Figure 15:
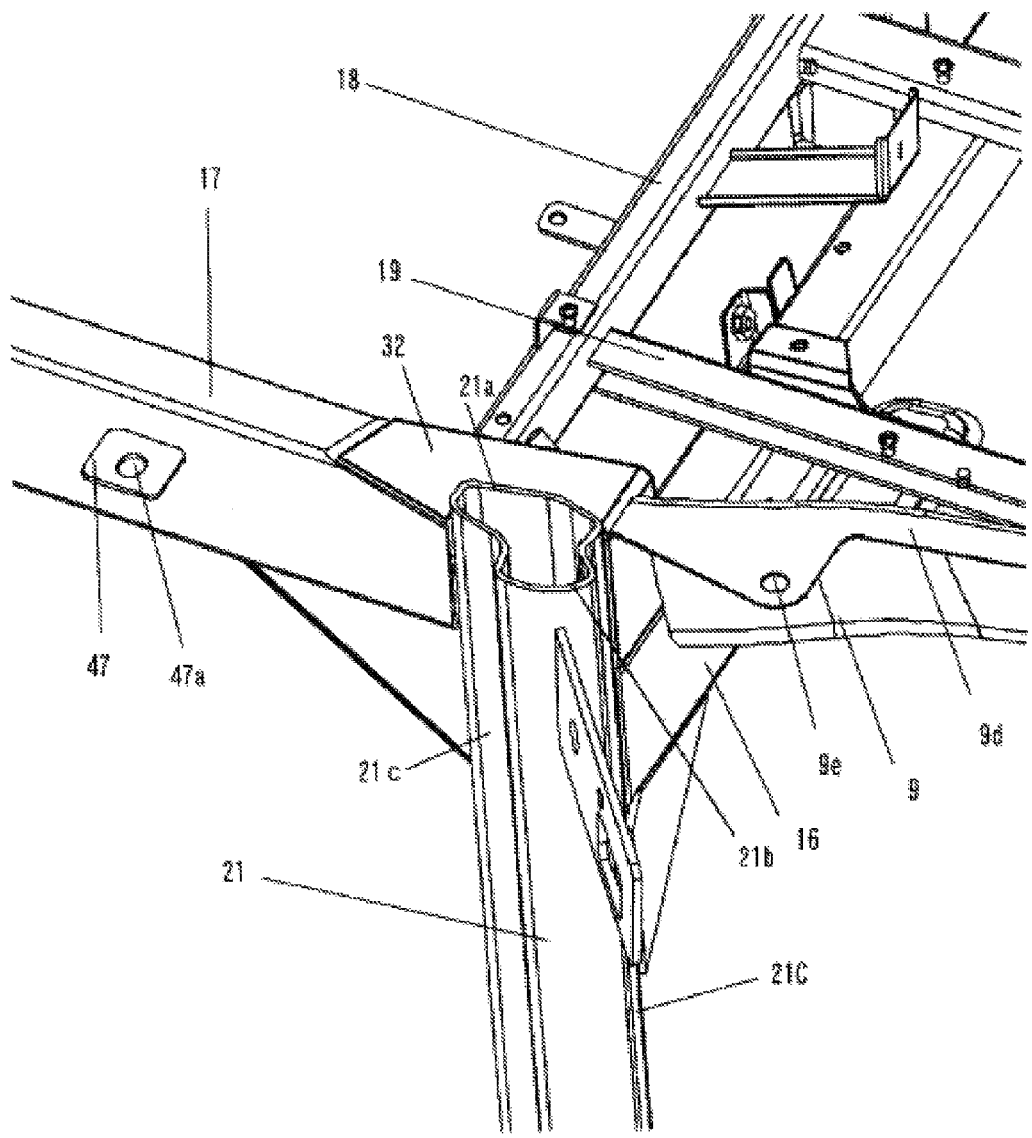
FIG. 15 is another expanded view of a part of the cabin frame structure.
Figure 16:
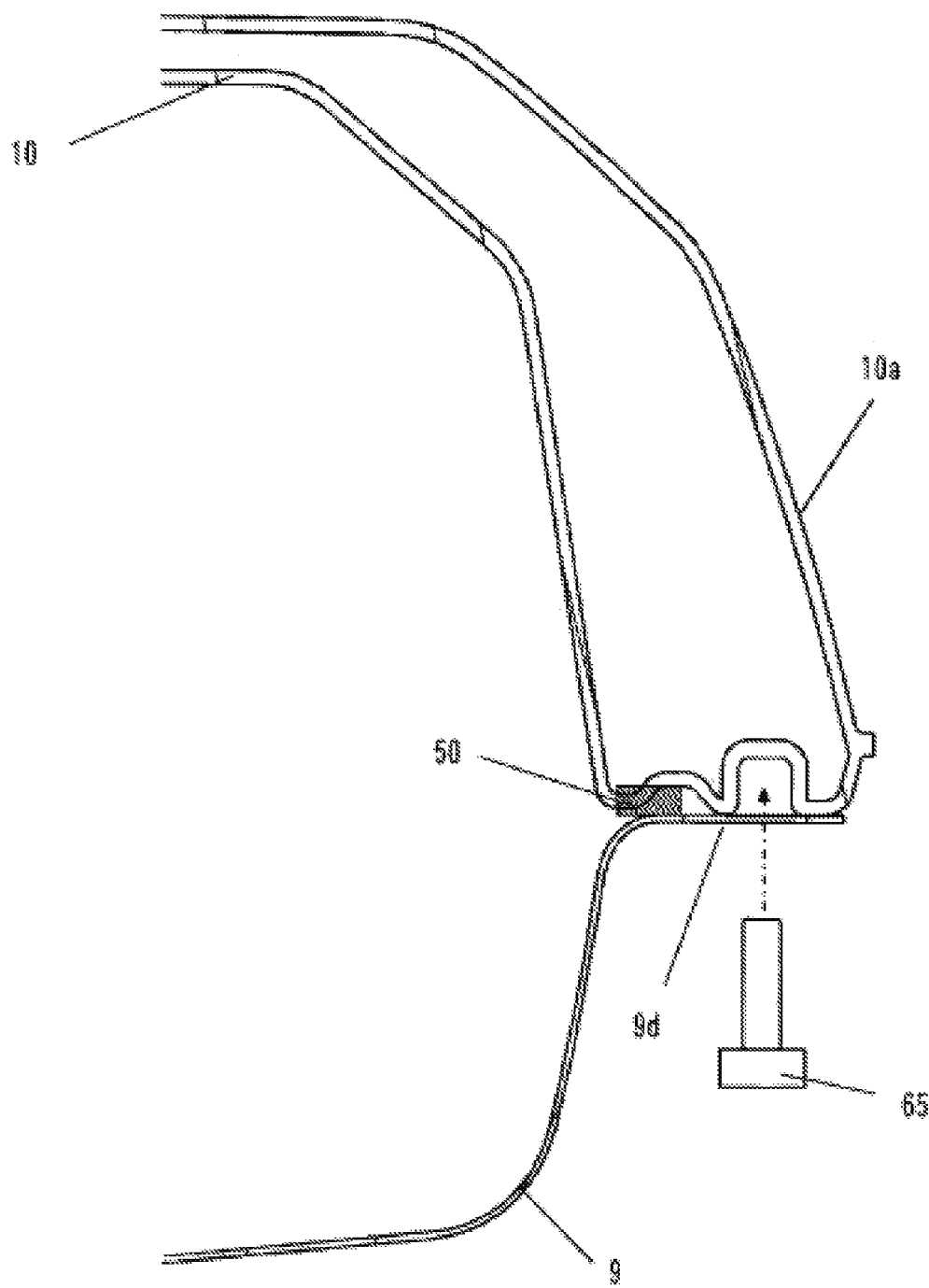
FIG. 16 is a cross-sectional view of the cabin frame along the A-A line in FIG. 12.
Figure 17:
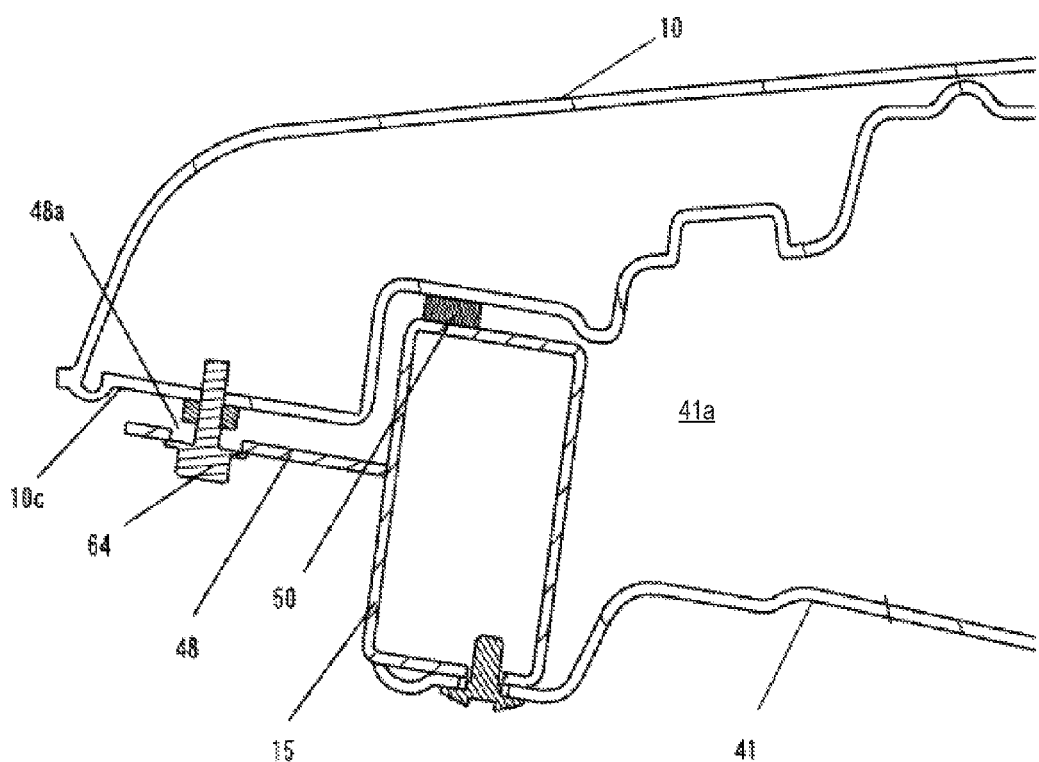
FIG. 17 is a cross-sectional view of the cabin frame along the B-B line in FIG. 12.
Figure 18:
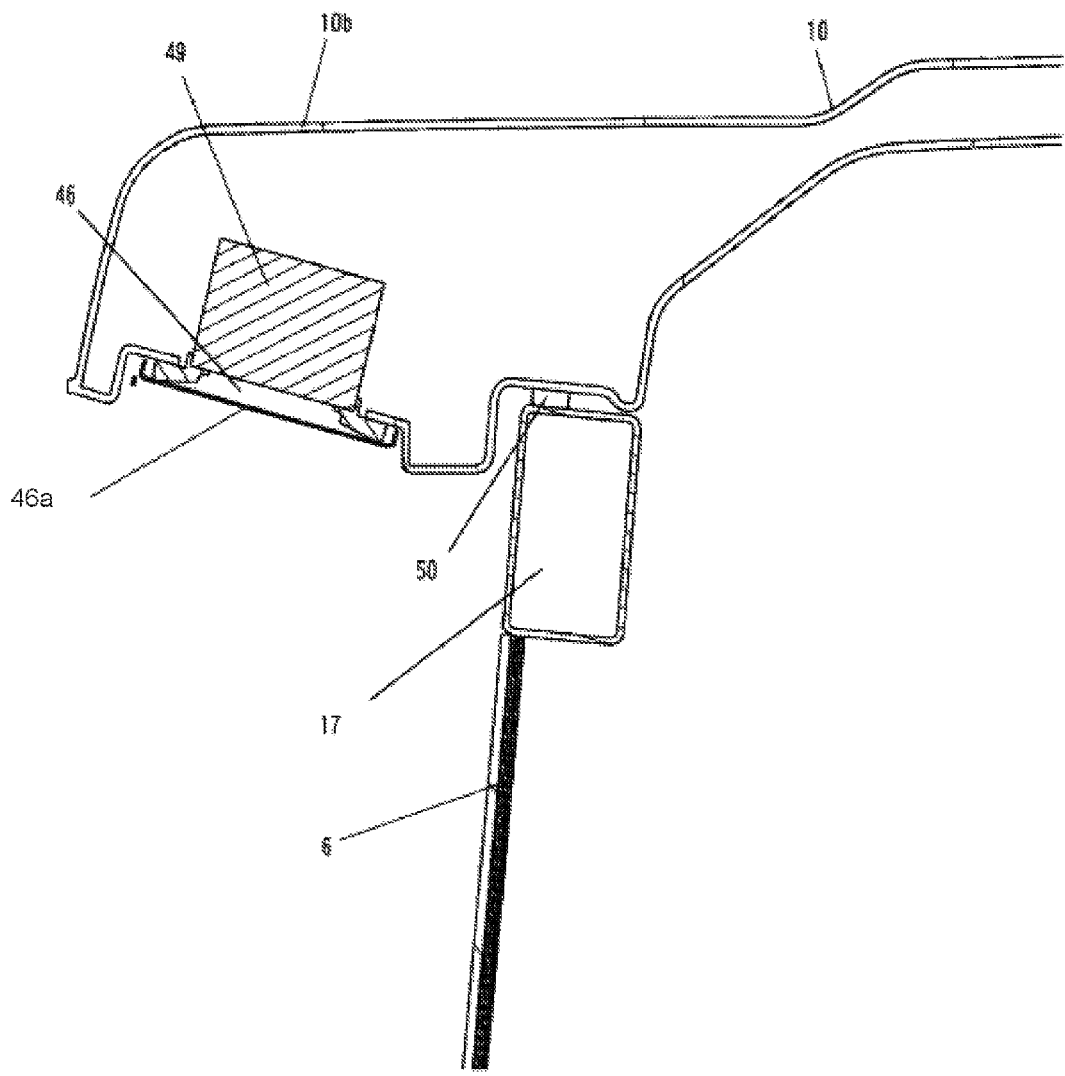
FIG. 18 is a cross-sectional view of the cabin frame along the C-C line in FIG. 12.

FIG. 1 to FIG. 3 show a tractor E equipped with the cabin K.

A bonnet 1 is provided at the front of the tractor E. The operator space is surrounded by the cabin K behind the bonnet 1. An engine 2 provided in the bonnet 1 provides the driving force for left and right front wheels 3 and rear wheels 4. An implement connecting unit 60 that is used to connect an implement is provided at the rear of the tractor E.

A door 5 to allow the operator to get in and out of the vehicle and a side windshield 6 are provided on the side of the cabin K. A front windshield 7 is provided at the front and an upper rear windshield 8a and a lower rear windshield 8b are provided at the rear. The door 5, the side windshield 6, the front windshield 7, the upper rear windshield 8a, and the lower rear windshield 8b are all formed from transparent glass.

An air conditioner unit Y is provided at the upper rear of the cabin K. A cover 9 covers the bottom of the air conditioner unit Y, and a roof 10 extends over a driver seat 24 and covers the top of the air conditioner unit Y. The air conditioner unit Y is provided below a narrow section 10a formed toward the rear of the roof 10. The roof 10 is formed from resin.

A frame structure used for the cabin K will be described.

At the bottom of the cabin K there is provided a floor unit H formed integrally from: a seat floor 11 on which the driver seat 24 is mounted; a step floor 12 that is used by the operator to get in and out of the tractor; fender units 13 that are provided to the left and right of the step floor 12; and a back surface unit 14 that is formed upright behind the step floor 12.

An opening 11a is formed at the center of the seat floor 11 to provide access for a worker when producing and assembling the cabin.

The back surface unit 14 is formed from a sheet-metal frame 34 that slopes diagonally upward toward the rear and that includes an opening section 34a formed at an inward position. The lower rear windshield 8b is attached to the opening section 34a. The left and right ends of the sheet-metal frame 34 are attached to the ends of the fender unit 13, and the lower end of the sheet-metal frame 34 is attached to the rearward end of the seat floor 11. A lower rear frame 35 that connects the bottoms of left and right rear pillars 21 is attached to the upper end of the sheet-metal frame 34.

A significant height offset is provided between the seat floor 11 and the step floor 12. Lateral side sections 12a of the step floor 12 are projected forward from a lateral center section 12b. A dashboard panel 23 is provided with an upright orientation at the front end of the lateral center section 12b and inward from the lateral side sections 12a.

The attachment positions of the seat floor 11, the step floor 12, the fender units 13, the back surface unit 14, and the dashboard panel 23 are welded to form the floor unit H as a single assembly. The floor unit H is a "completed part."

At the upper section of the cabin K there is provided a ceiling support unit T that is formed integrally from: a front frame 15 and a rear frame 16 that extend laterally; left and right side frames 17 that connect the ends of the front frame 15 and the rear frame 16; an air conditioner unit support frame 18 that supports an air conditioner unit Y; and a cover 9. The ceiling support unit T is formed as a single assembly. The ceiling support unit T is a "completed part."

The ends of the laterally extended air conditioner unit support frame 18 are attached to the inner side surfaces of the side frames 17 at positions slightly to the front of the rearward ends of the side frames 17. In addition, mounting brackets 19 for mounting the air conditioner unit Y are attached at intermediate positions of the air conditioner unit support frame 18 and extend rearward.

The floor unit H and the ceiling support unit T are connected by a plurality of vertically extended pillar units P. The pillar units P are formed from front pillars 20, rear pillars 21, and intermediate pillars 22. The front pillars 20, the rear pillars 21, and the intermediate pillars 22 are formed as left/right pairs.

The lower ends of the front pillar 20 are attached to the left and right ends of the lateral side sections 12a of the step floor 12. Connecting sections of the front frame 15 and the side frames 17 are attached to the upper ends of the front pillars 20. The lower ends of the intermediate pillars 22 are attached to the upper surfaces of intermediate positions of door attachment frames 61 that are extended along the fender units 13. The upper ends of the intermediate pillars 22 are attached to the bottom surface of the side frames 17 at intermediate positions. The lower ends of the rear pillars 21 are attached to the upper surfaces of the fender unit 13 at the rearward end thereof, and the upper ends of the rear pillars 21 are attached to the rearward ends of the side frames 17.

The ends of the rear frame 16 are attached to the inner side surfaces of the rear pillars 21 at positions slightly lower than the upper ends thereof. The front ends of the cover 9 are attached to the rear frame 16.

The attachment structures of the pillar unit P will be described in further detail.

The left and right ends of the front frame 15 and the front ends of the side frames 17 are connected by way of connecting plates 30, and spaces 31 are formed between the left and right ends of the front frame 15 and the front ends of the side frames 17. The connecting plate 30 straddles and connects the upper surface of the front frame 15 and the upper surface of the side frame 17 and is welded to the surfaces.

In addition, a cut-out section 12c is formed at the front corners of the lateral side sections 12a of the step floor 12. The bottoms of the front pillars 20 are attached by inserting and fitting them into the cut-out sections 12c, and the tops of the front pillars 20 are attached by inserting and fitting them into the spaces 31. The front pillars 20 are secured by welding the inner surfaces and the rearward surfaces of the bottoms thereof to the cut-out sections 12c. The inner surfaces of the tops of the front pillars 20 are welded to the left and right ends of the front frame 15. The rearward surfaces of the tops of the front pillars 20 are welded to the front ends of the side frames 17. The connecting plates 30 and the front pillars 20 are welded together as well.

Each front pillar 20 is hollow and is formed with a gourd-shaped cross section. The front frame 15, the connecting plate 30, and the side frame 17 are secured to an inwardly bulging section 20a. A side of the front windshield 7 and the frame of the door 5 are fitted to cavity sections 20c formed between the inwardly bulging sections 20a and the outwardly bulging sections 20b.

The door attachment frame 61 is shaped to match the shape of the top of the fender unit 13 and is formed from: a rear section 61a that is formed substantially flat; and a front section 61b that slopes forward and downward. The upper end of the intermediate pillar 22 is attached to the lower surface of the side frame 17 at an intermediate position, and the lower ends of the intermediate pillars 22 are attached to the upper surface of the front end of the rear section 61a of the door attachment frame 61. Welding is used to attach the intermediate pillars 22.

A vertical offset exists between the rearward ends of the side frames 17 and the left and right ends of the rear frame 16 but they are connected by way of connecting plates 32. Each of the connecting plates 32 straddles the position facing the left and right ends of the side frame 17 and the position facing the left and right ends of the rear frame 16 to form a space 57. The connecting plate 32 is secured by being welded to the upper surface of the rearward end of the side frame 17 and the rear surface of the left and right ends of the rear frame 16. In addition, the back surface of the connecting plate 32 is secured by being welded to an upright wall 9a of the cover 9.

The upper sections of the rear pillars 21 are inserted and fitted into the spaces 57, the rearward end sections of the side frames 17 are attached to the front surfaces of the upper sections of the rear pillars 21, and the left and right ends of the rear frame 16 are attached to the inner surfaces of the upper sections of the rear pillars 21. The left and right ends of the lower rear frame 35 are attached to the lower end of the rear pillar 21. Welding is performed to secure the side frames 17 to the rear pillars 21, the connecting plates 32 to the rear pillars 21, the rear frame 16 to the rear pillars 21, and the rear pillars 21 to the lower rear frame 35.

With the cabin according to this exemplary embodiment, the frame and assembly configuration allows the front frame 15 and the side frames 17 can be secured to the front pillars 20, thus providing a cabin with a strong connection structure. In addition, since the front frame 15 and the side frames 17 have been connected ahead of time with the connecting plates 30 when the front pillars 20 are attached, the front pillars 20 can be easily inserted into and aligned in the spaces 31.

In addition, the connecting plates 30 can be formed with a compact design while providing a strong connection structure between the front pillars 20, the front frame 15, the side frames 17, and the connecting plates 30.

In addition, the side frames 17 and the rear frame 16 can be secured to the rear pillars 21, providing a cabin with a strong connection structure. In addition, since the side frames 17 and the rear frame 16 have been connected ahead of time with the connecting plates 32 when the rear pillars 21 are attached, the rear pillars 21 can be easily inserted into and aligned in the spaces 57.

In addition, the connecting plates 32 can be formed with a compact design while providing a strong connection structure between the rear pillars 21, the rear frame 16, the side frames 17, and the connecting plates 32.

As with the front pillars 20, each rear pillar 21 is hollow and is formed with a gourd-shaped cross section. The side frame 17, the connecting plate 32, and the rear frame 16 are secured to an inwardly bulging section 21a. An end of the rear windshield 8 and the frame of the side windshield 6 are fitted to cavity sections 21c formed between the inwardly bulging section 21a and the outwardly bulging section 21b.

When manufacturing the cabin, the ceiling support unit T and the floor unit H are manufactured ahead of time and the ceiling support unit T and the floor unit H are connected using the pillar unit P on the assembly line.

The structure of the cover 9 will be described.

The cover 9 is formed with the upright wall 9a extending along the left and right side surfaces and the rearward end to form a tray (dish) shape. The front end of the cover 9 is attached to the rear frame 16. In addition, a flange 9d is formed extending outward from the upper end of the upright wall 9a. The flange 9d is formed with holes 9e for attachment of attachment/removal pieces 65, e.g., bolts, used to attach the narrow section 10a of the roof 10.

Next, the attachment/removal structure of the roof 10 will be described.

A plurality of roof attachment/removal plates 47 extends outward from the side surfaces of the side frames 17. The roof attachment/removal plates 47 are formed with holes 47a for attachment of attachment/removal pieces (not shown in the drawings), e.g., bolts. Side canopies 10b of the roof 10, which project outward from the side frames 17, are attached using attachment/removal piece (not shown in the drawings).

A plurality of roof attachment/removal plates 48 extends frontward from the front surface of the front frame 15. Holes 48a for attachment/removal pieces 64 are formed on the roof attachment/removal plates 48 as well. The attachment/removal pieces 64 are attached to a front canopy 10c of the roof that is projected frontward from the front frame 15.

The roof 10 is mounted on the ceiling support unit T and can be attached and removed using attachment/removal pieces at the holes 9e, the holes 47a, and the holes 48a.

Next, the structure of the seal between the roof 10 and the ceiling support unit will be described.

A seal 50 is formed from a resin, e.g., urethane or rubber, and is provided across the entire joint between the roof 10 and the ceiling support unit T to prevent water from entering the roof 10.

At the cover 9, the seal 50 is attached along the base end of the flange 9d. This structure allows the roof 10 to be attached tightly to the flange 9d of the cover 9. In addition, there is no obstruction when attaching or removing the attachment/removal pieces 65 at the holes 9e formed on the flange 9d of the cover 9.

At the side frames 17, the seal 50 extends along the outer end of the upper surface of the side frames 17. As a result, the roof 10 can be attached tightly to the side frames 17 without obstructing the attachment and removal of attachment pieces at the roof attachment/removal plates 47. In addition, at the front frame 15, the seal 50 is attached along the front side of the upper surface of the front frame 15. As a result, the roof 10 can be joined tightly to the front frame 15 without obstructing the attachment and removal of attachment pieces at the roof attachment/removal plates 48.

In addition, the seal 50 is attached to the upper surfaces of the connecting plates 30 to the front and the connecting plates 32 to the rear. Thus, the connecting plates 30 and the connecting plates 32 form a flat plane and allow easy attachment of the seal 50, and the seal 50 can be attached tightly to the ceiling support unit T with the entire roof 10 while being diverted around the pillar unit P.

Next, the air conditioner unit Y will be described.

This air conditioner unit Y is provided so as to project rearward from the cabin K at the roof 10 over the cabin K. Thus, the air conditioner unit Y is provided at the upper rear section of the cabin K.

Within the cabin K, a ceiling panel 41 is provided at the upper end and extends along the roof 10. A space 41a is formed between the ceiling panel 41 and the roof 10.

Air conditioner ducts 40 are connected to the air conditioner unit Y and are extended frontward. In other words, the air conditioner ducts 40 are extended from the air conditioner unit Y toward the inside of the cabin K. The air conditioner ducts 40 are a pair of ducts provided at the left and right sides of the ceiling section of the cabin K. More specifically, the air conditioner ducts 40 are provided in the vicinity of the left and right ends of the cabin K, and the space 41a between the roof 10 and the ceiling panel 41, extending forward from the air conditioner unit Y. In addition, a plurality of air vents 42 are formed on the undersides of the air conditioner ducts 40 to blow the air flowing through the air conditioner ducts 40 into the cabin K. The air vents 42 face into the cabin K from the ceiling panel 41. As a result, the air conditioner ducts 40 are able to direct the air from the air conditioner unit Y into the cabin K.

In addition, an operating panel unit 43, i.e., an air conditioner operation panel used to operate the air conditioner unit Y, is provided in the cabin K above and to the front of the driver seat 24 in which the tractor operator sits. This operating panel unit 43 is provided at a position in the cabin K toward the roof 10 and above and to the front of the driver seat. Furthermore, the inside of the cabin K is provided with equipment to provide comfort when the operator is driving such as an audio unit 44, i.e., an audio device.

In addition, the left and right sides of the roof 10 are projected outward from the side frames 17 to form the side canopies 10b. Intake vents 46 to introduce air from the outside into the cabin K are formed on the undersides of the side canopies 10b. The intake vents 46 are covered by cover plates 46a, while a gap separates the intake vents 46 from the cover plates 46a so that air from the outside can be introduced. A filter 49 is provided in the hollow section in the roof 10.

The rearward ends of the air conditioner ducts 40 are connected to a distribution duct 55, which splits the air from the air conditioner unit Y to the left and to the right. The air blown out by the air conditioner unit Y is split to the left and the right by the distribution duct 55 to flow forward through the left and right air conditioner ducts 40, thus providing air flow inside the cabin K on the left and right sides.

The side walls of the pair of air conditioner ducts 40 are bent horizontally inward at front sections of the air conditioner ducts 40 to form bends 40a. More specifically, the bends 40a are formed on the air conditioner ducts 40 at front sections further toward the front than the rearward ends of the audio unit 44 and the operating panel unit 43. The left and right bends 40a are formed along opposing planes.

Since the air conditioner ducts 40 are formed with these bends 40a, spaces with a predetermined size are defined in the vicinity of the bends 40a, i.e., on the outer surface side of the side walls forming the bends 40a. The operating panel unit 43 and the audio unit 44 are formed in the spaces defined by the bends. More specifically, the operating panel unit 43 is provided on the outer surface side of a side wall of the bend 40a of one of the pair of air conditioner ducts 40. The audio unit 44 is provided on the outer surface side of a side wall of the bend 40a of the other air conditioner duct 40.

Inside the cabin K, a sun visor 45 is provided between the operating panel unit 43 and the audio unit 44. This sun visor 45 is formed with a substantially rectangular plate shape. When the plate-shaped sun visor 45 is oriented horizontally, the front and rearward ends are oriented along the lateral axis of the cabin K and the left and right ends are oriented along the longitudinal axis.

In addition to tractor cabins, the present invention can be used in another work vehicle such as construction equipment machinery as well.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A work vehicle cabin, comprising:
front and rear frame members extending laterally, each of the front and rear frame members having an upper surface and ends;
a pair of side frame members extending longitudinally, each of the side frame members having an upper surface, a front end, and a rear end;
front connecting plates having upper surfaces and connecting the side frame members and the front frame member, the front connecting plates straddling across the upper surfaces of the side frame members and the upper surface of the front frame member, the front ends of the side frame members and the ends of the front frame member forming front spaces therebetween;
rear connecting plates having upper surfaces and connecting the side frame members and the rear frame member, the rear connecting plates straddling across the upper surfaces of the side frame members and the upper surface of the rear frame member, the rear ends of the side frame members and the ends of the rear frame member forming rear spaces therebetween;
front pillars provided in the front spaces and attached to the front ends of the side frame members, the ends of the front frame member, and the front connecting plates;
rear pillars provided in the rear spaces and attached to the rear ends of the side frame members, the ends of the rear frame member, and the rear connecting plates;
an air conditioner unit;
a roof extending over the air conditioner unit; and
a seal provided entirely between the roof and the upper surfaces of the side frame members, the upper surface of the front frame member, the upper surface of the rear frame member, the upper surfaces of the front connecting plates, and the upper surfaces of the rear connecting plates,
wherein the air conditioner unit is provided behind the rear frame member and is covered with a cover, the cover having an upright wall formed along sides and rear thereof defining a tray shape, a flange formed along an upper end of the upright wall for attachment with the roof, the upright wall having a front end attached to the rear connecting plates, and wherein the seal is provided between the upper surfaces of the rear connecting plates and the flange.

* * * * *